US012437905B2

(12) United States Patent
Kuo et al.

(10) Patent No.: US 12,437,905 B2
(45) **Date of Patent: *Oct. 7, 2025**

(54) RESISTOR

(71) Applicant: VIKING TECH CORPORATION, Hukou Township, Hsinchu County (TW)

(72) Inventors: Shun-Ho Kuo, Hukou Township, Hsinchu County (TW); Chi-Yu Lu, Hukou Township, Hsinchu County (TW)

(73) Assignee: VIKING TECH CORPORATION, Hsinchu County (TW)

( * ) Notice: Subject to any disclaimer, the term of this patent is extended or adjusted under 35 U.S.C. 154(b) by 374 days.

This patent is subject to a terminal disclaimer.

(21) Appl. No.: 18/153,830

(22) Filed: Jan. 12, 2023

(65) Prior Publication Data

US 2024/0242860 A1 Jul. 18, 2024

(51) Int. Cl.
*H01C 1/02* (2006.01)

(52) U.S. Cl.
CPC .................................... *H01C 1/02* (2013.01)

(58) Field of Classification Search
CPC ........................................................ H01C 1/02
See application file for complete search history.

(56) References Cited

U.S. PATENT DOCUMENTS

| | | | | |
|---|---|---|---|---|
| 8,486,533 | B2 * | 7/2013 | Boday | H05K 3/284 428/447 |
| 10,832,837 | B2 * | 11/2020 | Shinoura | H01C 17/02 |
| 11,205,531 | B2 * | 12/2021 | Kuo | H01C 7/00 |
| 11,688,533 | B2 * | 6/2023 | Chang | H01C 1/142 338/308 |
| 2008/0236873 | A1 * | 10/2008 | Kuwajima | H01C 1/148 29/842 |
| 2013/0154058 | A1 * | 6/2013 | Boday | H01C 1/14 257/536 |
| 2017/0194081 | A1 * | 7/2017 | Boday | C09D 7/62 |
| 2020/0328014 | A1 * | 10/2020 | Shinoura | H01C 1/142 |
| 2023/0134039 | A1 * | 5/2023 | Chang | H01C 1/148 338/308 |

* cited by examiner

*Primary Examiner* — Kyung S Lee
(74) *Attorney, Agent, or Firm* — Muncy, Geissler, Olds & Lowe, P.C.

(57) ABSTRACT

The present invention proposes a resistor with two barrier layers covered by a protection layer, at both sides of the resistor to resist the moisture and sulphide penetration from both sides. The barrier can enhance the anti-corrosion ability of the resister. For a metallic barrier, a distance to the resistance layer and the internal electrode layer is necessary.

7 Claims, 2 Drawing Sheets

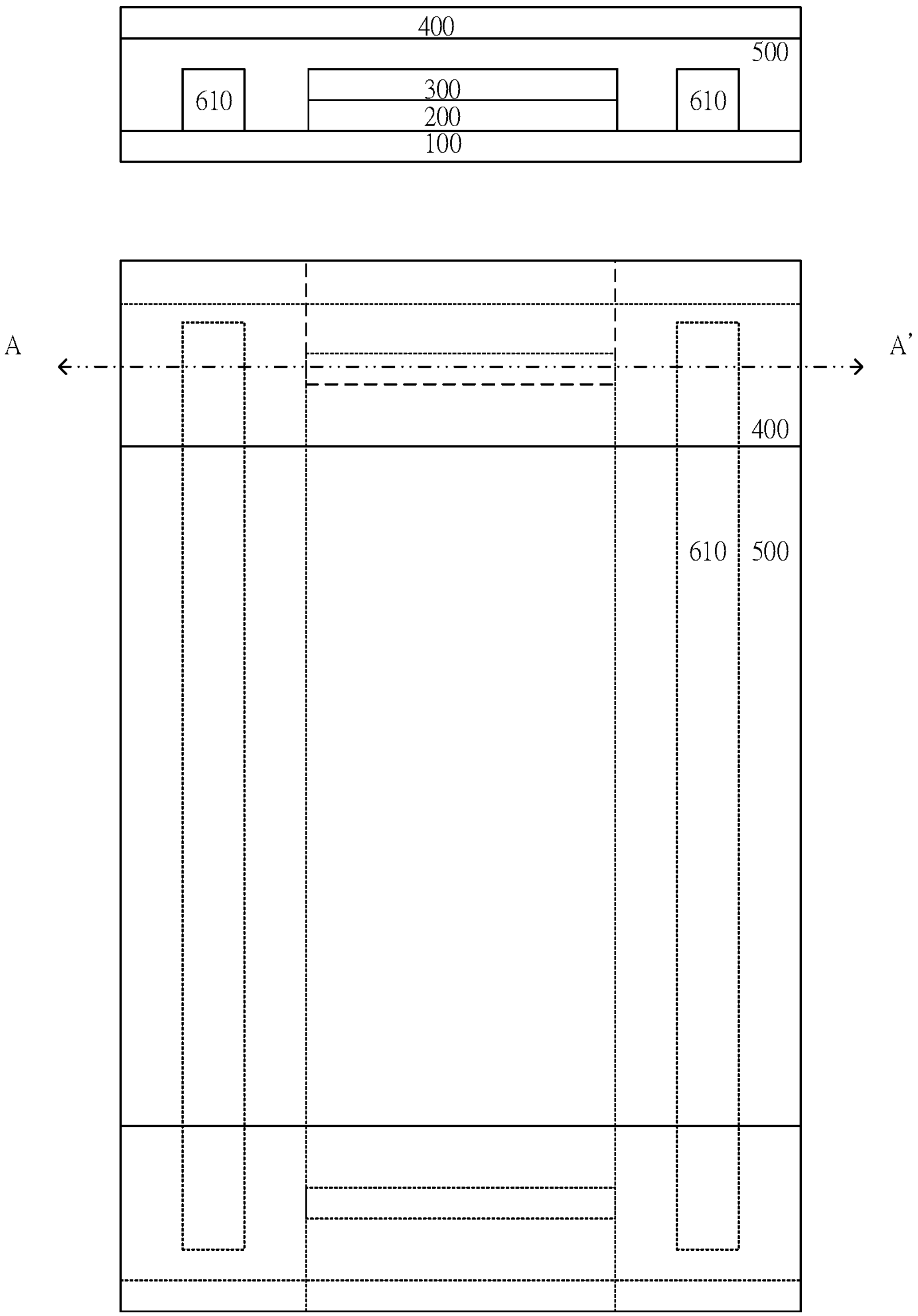
【Fig.1】

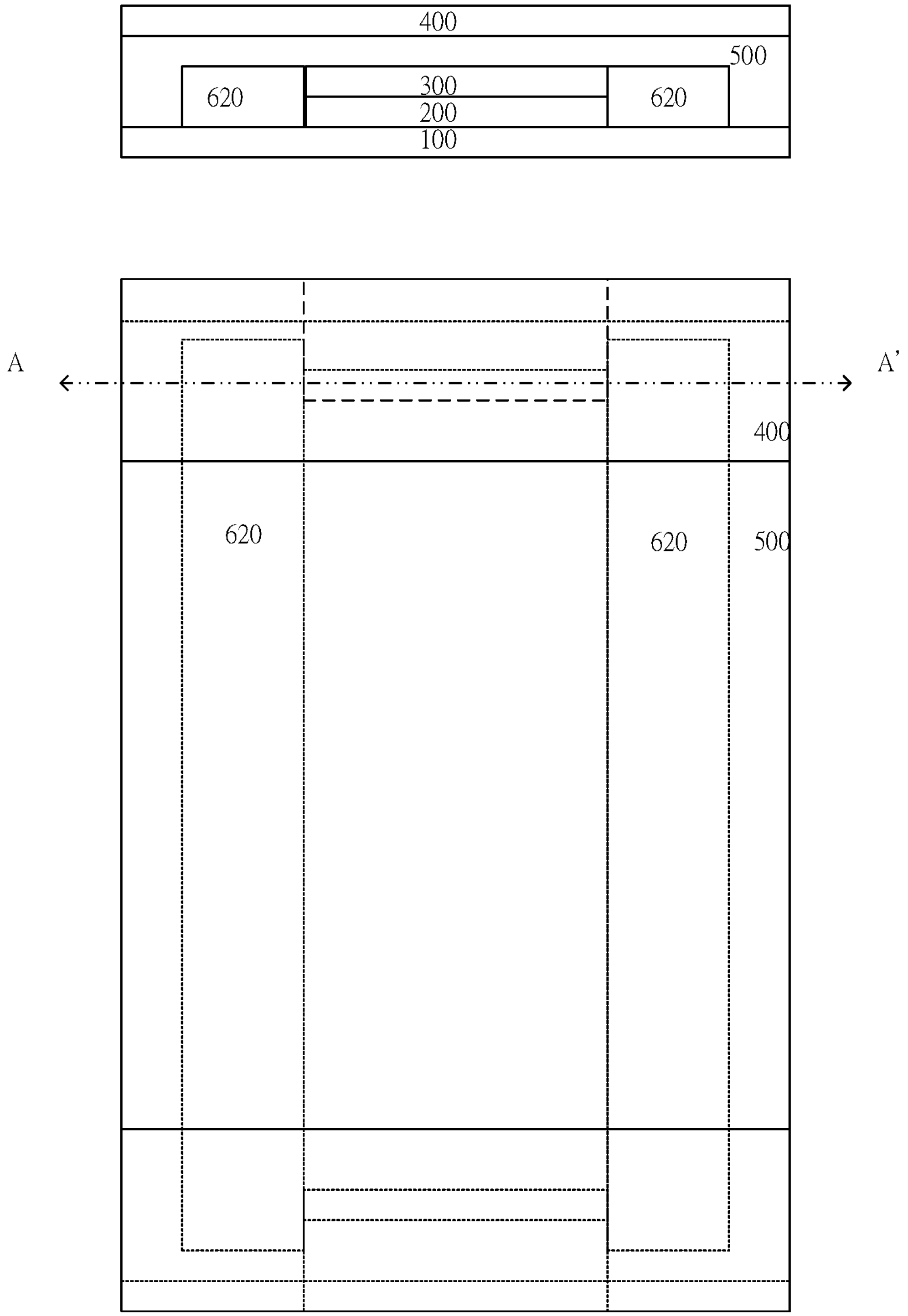
【Fig. 2】

RESISTOR

BACKGROUND OF THE INVENTION

1. Field of the Invention

The present invention relates to a resistor, especially a resistor with a barrier layer arranged on both long sides of the resistance layer.

2. Description of the Prior Art

As electrical appliances become more and more sophisticated, the requirements for the corrosion resistance of resistors are more stringent. It is still an important issue to maintain the stability of the resistor by resisting the intrusion of moisture or sulphide in the environment.

The present invention provides a resistor structure to resist moisture/sulphide corrosion from the long side of the resistor as below.

SUMMARY OF THE INVENTION

The present invention provides a resistor. Two internal electrode layers are arranged on the surface near both ends of the substrate, a resistance layer is laid on the central region of the substrate between the two internal electrode layers, and barrier layers are laid on the adjacent surfaces on both sides. For a metal barrier layer, a certain distance from the resistance layer and the two internal electrode layers is necessary. The distance can avoid electrical conduction. The resistance layer, the two barrier layers and part of the two internal electrode layers are covered with a protective layer. The exposed part of the internal electrode layer and its adjacent surface of the protective layer are covered with the external electrode layer. The two barrier layers can effectively reduce the possibility of moisture or sulphide intrusion.

BRIEF DESCRIPTION OF THE DRAWINGS

FIG. 1 is a schematic top view and a partial side view of one embodiment of the resistor of the present invention.

FIG. 2 is a schematic top view and a partial side view of one embodiment of the resistor of the present invention.

DESCRIPTION OF THE PREFERRED EMBODIMENTS

The following embodiments and the diagrams are intended to illustrate the spirit of the present invention to person having ordinary skilled in the art to be clearly understand the technology of the present invention, but are not intended to limit its scope, as defined by the claims. It is emphasized that the diagrams are for illustration only, and do not represent the actual size or quantity of components, and some details may not be fully drawn for the sake of simplicity of the diagrams.

For the sake of brevity, a rectangular resistor is used as an example, but it must be understood that it is used as an example rather than to limit the scope of the present invention. The short side of the resistor is called both ends, the long side is called both sides, the direction of the long side is the axial or longitudinal direction, and the short side is the transverse direction.

The resistor is provided with internal electrode layers at both ends of the substrate, and a resistance layer is laid in the middle area to connect the internal electrode layers at both ends. Next, a protective layer is laid, and the protective layer covers the resistance layer and part of the internal electrode layer. Next, an external electrode layer is laid, which covers the exposed internal electrode layer and its nearby surface of the protective layer. The external electrode is used for connecting with an external circuit.

Usually, the corrosion resistance to moisture or sulphide is strong for both ends of the resistor due to the external electrode layer and the protective layer, but weak for both sides. In the present invention, a barrier layer is arranged on each side of the resistor to enhance the corrosion resistance of both sides.

In particular, this technology is also applicable to resistors of different shapes. The key point is to arrange a barrier layer surround the resistance layer and the internal electrode layer of a resistor to resist the intrusion of moisture and sulphide, so as to achieve the anti-corrosion function.

The barrier layer is disposed under the protective layer. For a metallic barrier layer made by lead, copper, aluminum, etc., a distance from the resistance layer and the internal electrode layer is necessary. For a non-metallic barrier layer made by glass, ceramics barrier layer, etc., the barrier can be adjacent to the resistance layer and the internal electrode layer.

In the embodiment of FIG. 1, the barrier layer 610, completely covered by the protective layer 500, has a distance from the resistance layer 300 and the internal electrode layer 200. Accordingly, the barrier layer 610 may be a metallic barrier layer or a non-metallic barrier layer.

From a top view of the resistor, at the bottom picture of FIG. 1, only the external electrode layer 400 and the protective layer 500 are visual. The barrier layer 610, the internal electrode layer and the resistance layer is not visual but has been marked with dotted lines in the top view for better understanding geometric relationship.

A cross-sectional view of section line AA' is shown in the upper of FIG. 1. The internal electrode layer 200 and the resistance layers 300 are stacked in the middle area on the substrate 100. A pair of the barrier layers 610, covered by the protective layer 500, are arranged on two opposite sides of the substrate 100. On the protective layer 500 is the external electrode layer 400. In some embodiments, each the barrier layer 610 has a distance from the internal electrode layer 200 and the resistance layer 300.

The embodiment in FIG. 2 is an embodiment of a pair of non-metallic barrier layer. The pair of non-metallic barrier layers 620 are separately disposed on two opposite sides of the substrate 100 and respectively adjacent to the resistance layer 300 and the internal electrode layer 200. The bottom picture of FIG. 2 is a top view of the resistor and the upper picture is the cross-sectional view of section line AA'.

What is claimed is:

1. A resistor comprising:

an internal electrode layer disposed on a substrate towards each end of which the internal electrode layer stretches, and a resistance layer disposed on an axial central region of the substrate and partially overlapping the internal elect rode layer;

a pair of barrier layers separately disposed on two opposite sides of the substrate and respectively located with a certain distance from the resistance layer and the internal electrode layer;

a protective layer covering the resistance layer, the barrier layer and part of the internal electrode layer; and an external electrode layer disposed to cover an exposed part of the internal electrode layer and the adjacent protective layer thereof.

2. The resistor according to claim 1, wherein the pair of barrier layers are conductor barriers.

3. The resistor according to claim 2, wherein the conductor barriers are metallic barriers.

4. The resistor according to claim 3, wherein the metallic barriers are made by lead, copper, aluminum or their combinations.

5. The resistor according to claim 1, wherein the pair of barrier layers are non-conductive barriers.

6. The resistor according to claim 5, wherein the non-conductive barriers are made of glass or ceramics.

7. A resistor, comprising:

an internal electrode layers disposed on a substrate towards each end of which the internal electrode layer stretches, and a resistance layer on an axial central region of the substrate and partially overlapping the internal elect rode layer;

a pair of non-metallic barrier layers separately disposed on two opposite sides of the substrate and respectively adjacent to the resistance layer and the internal electrode layer;

a protective layer covering the resistance layer, the barrier layer and part of the internal electrode layer; and an external electrode layer disposed to cover an exposed part of the internal elect rode layer and the adjacent protective layer thereof.

* * * * *